Figure 1:
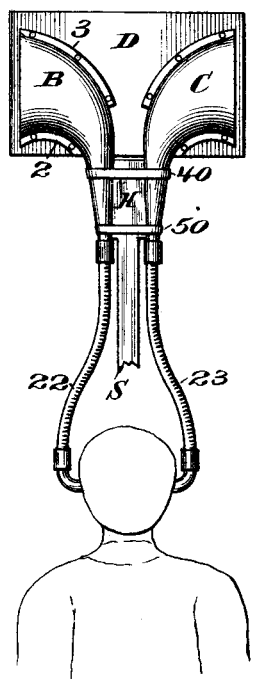

(No Model.) 2 Sheets—Sheet 1.

D. P. HEAP.
TOPOPHONE.

No. 590,062. Patented Sept. 14, 1897.

Attest:
Geo. H. Botts
A. T. Bourke

Inventor
David Porter Heap
by
Philipp, Munson & Phelps
Attys (No Model.) 2 Sheets—Sheet 2.

D. P. HEAP.
TOPOPHONE.

No. 590,062. Patented Sept. 14, 1897.

Attest:
Geo. H. Bott
A. W. Bourke

Inventor
David Porter Heap
by
Philipp Jinnum & Phelps
Attys

UNITED STATES PATENT OFFICE.

DAVID PORTER HEAP, OF THE UNITED STATES ARMY.

TOPOPHONE.

SPECIFICATION forming part of Letters Patent No. 590,062, dated September 14, 1897.

Application filed October 22, 1896. Serial No. 609,664. (No model.)

*To all whom it may concern:*

Be it known that I, DAVID PORTER HEAP, a citizen of the United States and an officer in the Corps of Engineers, United States Army, now residing at Wilmington, county of New Hanover, and State of North Carolina, have invented certain new and useful Improvements in Topophones, fully described and represented in the following specification and the accompanying drawings, forming a part of the same.

This invention relates to improvements in sound-locating instruments, the instrument embodying the present improvements being known as a "topophone."

The principal purpose of this invention is to enable vessels to change their direction of movement with relation to dangerous objects, such as vessels, icebergs, the shore, or similar obstacles to their safe movement, and thus avoid contact or collision with them, which purpose is attained by means of an instrument whereby the direction or source of sounds produced at or reflected from a more or less distant point from the instrument may be determined in time to enable the vessel to escape, if necessary, any danger the source of sound may offer. The usefulness of this instrument is especially realized by its employment as an aid to navigation, its operation in such use being to detect and locate the direction or position of a sound-producing object in its relation to a vessel at such times when said object may not be visually perceived, as at night, during foggy weather, or by reason of distance; but the instrument is susceptible of other uses, as during a war, when it is desirable to ascertain the location of an approaching body of men or the position of a dangerous cannon and the like when the same are not visible.

The present invention consists in novel constructions of the instrument, fully hereinafter explained and claimed, having for its object not only the increase of sensitiveness of the instrument whereby the range of its sound-detecting capacity is enlarged, but improving its mode of operation, whereby exactitude in determining the direction of the sound is attained without extensive movement of the instrument, whereby a sound produced from an object—such as a horn, bell, whistle, or cannon—or one deflected from any object, as by echo, or one made, as by a body of men, may be detected and have its direction indicated acoustically, so that while the object is sufficiently distant, as from a moving vessel, the direction of movement of the latter may be changed and a safe course be made that will avoid collision with said object or some other advantage be taken of the definite knowledge thus attained, such as the making or facilitating of an attack on a body of troops or its armament, or distant sound-signals be effectively heard and understood.

Practical embodiments of these improvements are illustrated in the accompanying drawings, in which—

Figure 2:
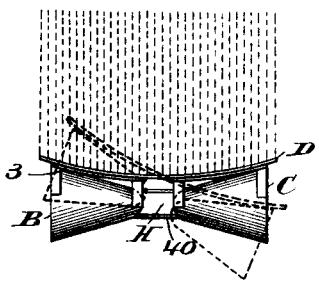
Figure 3:
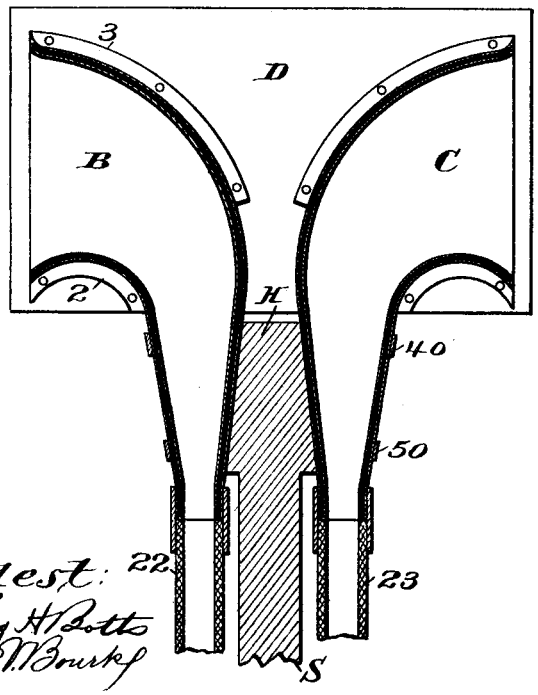
Figure 4:
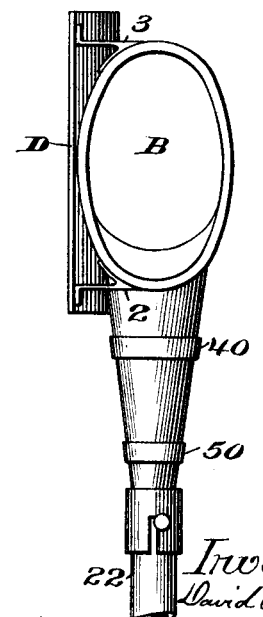
Figure 5:
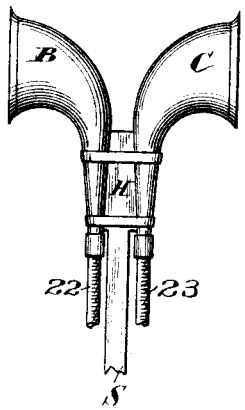
Figure 6:
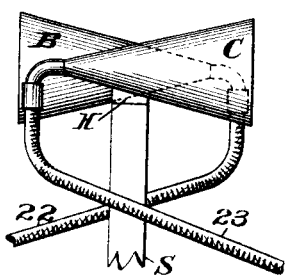
Figure 7:
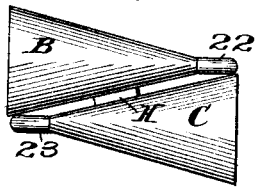
Figure 8:
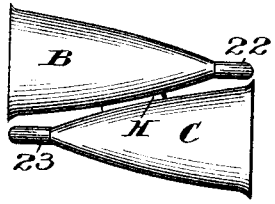

Figure 1 is rear elevation of the instrument, which illustrates it as sustained for use by a supporting-standard held or manipulated by the operator. Fig. 2 is a plan view of the instrument, to which parallel dotted lines are added to indicate the direction of sound-waves. Fig. 3 is an enlarged vertical sectional elevation of the same, as viewed from the rear. Fig. 4 is a side elevation of the same as seen looking in the direction of the arrows in Figs. 1 and 3. Fig. 5 is a side elevation of an instrument in which the receivers are supported a distance apart and are without a front guard. Fig. 6 is a side elevation of another form and arrangement of receivers in which this invention may be embodied. Fig. 7 is a plan view thereof, and Fig. 8 is a plan view of still another form and arrangement of receivers in which the invention may be embodied.

The essential characteristic features of this instrument are two acoustic receivers whose mouths point in substantially opposite directions and thus made incapable of simultaneously pointing in the same direction, or in that of the object producing the sound, the location of which it is required to determine, said receivers being provided with sound-conductors for conveying the sound to the ears of the user, all of which is hereinafter fully explained and claimed.

In the precise embodiments shown in the drawings of the present invention, which are preferable forms, the example shown in Figs. 1 to 4 comprises sound-receivers B C, which are in general structure of conical form, their diminishing stems or rearward portions being curved at approximately right angles to their mouth portions, so that the receivers may preferably be supported above the head of the user and normally stand with their mouths pointing in substantially diametrically opposite directions and at right angles to the line of vision of the user, to whose ears said diminishing stems or rearward terminations are directly connected by conducting-tubes 22 23 and suitable earpieces, the parts being supported by suitable mountings whereby the instrument may be conveniently turned in respect to the source of sound. These sound-receivers are separate and distinct members, secured together in their described relation, in this, one of the preferable forms, by being fastened with stay-bands 40 50, which attach them to the head H of a carrying-staff, as S. This staff may be operated wholly by hand, or be supported on some base and vibrated by some attachment.

Although not requisite to the proper operation of this instrument, for the reason that the outer sides of these sound-receivers will perform the same function, as appears by other illustrations, it is desirable to provide them with a guard or deflector D, which at times so protects them that the sound-waves may be wholly or partially excluded from both or either of them. In Figs. 1 to 4 the guard is shown as arranged in front of and close to their outer sides, so as to at least cover the same, although it is preferable that this guard or deflector D shall extend somewhat beyond the mouths or open ends of the sound-receivers. This guard, which is similar to and serves a similar purpose to the front guard described in my Patent No. 564,926, is shown as slightly curved, and this is desirable, as that form tends to deflect the sound-waves, which are to be rejected from action therewith, away from the instrument; but said deflecting-guard may be straight.

Any mode of attaching the guard to the receivers may be adopted, as the angle-bars 23.

Although the receivers are shown as supported for use by a staff, as S, and notwithstanding that it is preferable to support them above the head of the user, this instrument may be mounted for use in various ways. Thus it might be supported on a tripod or other stand, so as to be capable of moving pivotally thereon, its sound-conductors B C being continued to earpieces by suitable connections, as the tubes 22 23; but other modes of supporting the said receivers so that they may be connected, respectively, with the right and left ears of the operator and yet be readily moved with respect to the direction of the sound, by which the advantages of this invention may be attained, will be apparent.

This instrument may be embodied as in Figs. 5 to 8, wherein structures are shown which are devoid of any front guard. Such guard may be omitted, for the reason that in some structures of this instrument its sides themselves act as a guard, as is especially apparent from Fig. 6; but in some uses the structure of Fig. 5 is perfectly available, for the reason that with the other protections against the injurious action of sound-waves passing the instrument or otherwise reaching the operator, as hereinafter explained, the instrument is operative for many if not all of the uses for which it is designed, whether or not it is provided with the enlarged rim M.

In the modifications containing the invention shown in Figs. 6, 7, and 8 the sound-receivers are somewhat different in form and relative arrangement from those shown in Figs. 1 to 5, but point in substantially opposite directions.

In the special use of this instrument, as upon vessels or in similar situations, whether or not the operator is housed, it is important to protect the ears from extraneous or local sounds by covering the head of the operator with a non-conducting helmet, so that such sounds may not be heard through impact with the body or portions thereof.

A good form of helmet and earpiece-carrier is illustrated and described in Patent No. 564,926, granted to me July 28, 1896, and it should be stated that such a helmet may be extended to cover the face of the user to a greater extent than is shown in such patent and be extended downward by a sound-proof appendage that will more or less protect the body of the user from conveying sound to his ears. Of course the means for protecting the body from conducting sounds to the ears may, instead of being connected with the helmet, be a separate structure fastened thereon or be independent of the helmet, and when adjusted coöperate therewith so as to protect as much of the person of the operator as may be found desirable.

As isolation of the instrument from the conduction of sound-waves other than those which enter the mouths of the acoustic receivers is essential to perfect results, especially when the sound-producing object is very distant or the sound is weak it is important that the instrument itself shall be adequately protected from transmitting local sounds as well as those it is desired to locate, and this is partially realized by the non-conducting feature of the instrument described in my said patent. I have found, however, in practical use that no matter what material composes the acoustic receivers themselves they must, in order to attain the highest efficiency, be made sound-proof by incorporating with them some means rendering them sound-proof, or, in other words, rendered incapable of transmitting through their walls sound-waves impinging upon their exterior surfaces or sides. This I accomplish by making them out of a non-sound-conducting substance, as wood fiber, which may, if made thick enough, be capable of self-support, though it is preferable to provide it with a metal portion to aid its support. Another way to effect the same result is to construct the receivers with double walls, so as to provide a space between them and to interpose between the composite wall of each some non-sound-conducting material, as is shown in Fig. 3, where the space thus provided between their double walls is filled, packed, or contains a non-sound-conducting material.

The use of this instrument will be explained with special reference to Figs. 1 to 4. It is obvious that when the same is presented with the sides of its acoustic receivers facing or directed to the source of sound, as shown in full lines in Fig. 2, whether or not it has the front guard D, the waves of sound represented by the parallel dotted lines in said figure will impinge against such sides or move past their open mouths without entering therein. If under this adjustment or presentation of the instrument it should be presented not directly toward the source of sound, as is indicated by the dotted outlines of it in said Fig. 2, some of the waves of sound will then enter from the left-hand side of the observer and be directed in the left-hand receiver, at which time the waves of sound on his right-hand side will pass beyond the right-hand receiver without entering it. Thus the sound-waves entering the left-hand receiver will be heard in his left ear and none will be practically audible in his right-hand ear, and hence he will know positively that the source of sound is upon his left-hand side, and if he then turns the instrument to the left until he hears the sound in his right ear he will have found limits of direction within which that sound-producing object must exist and will then be able to tell the general direction of such sound. If now upon vibrating the instrument to the right-hand until the sound is again heard in the right ear, the observer will know that a horizontal line at right angles to the axis of the two receivers has passed the line of direction of the sound, and if he then vibrates the receivers so as to hear the sound alternately in each ear he will have reduced said limits and know that a line bisecting the angle of oscillation will be the line of direction of the sound.

It will thus appear that the range of vibration necessary to locate the sound by the use of this peculiar instrument is diminished to a small degree, thereby enabling a speedy location of the direction of sound to be found with but slight movement of the instrument itself.

What is claimed is—

1. A sound-locating instrument consisting of two acoustic receivers, whose mouths point in substantially opposite directions, said receivers having their inner ends provided with sound-conducting tubes having means for connecting each with an ear of the observer, substantially as described.

2. A sound-locating instrument consisting of two acoustic receivers, whose mouths point in substantially opposite directions, and whose inner ends are provided with sound-conducting tubes having means for connecting each with an ear of the observer, said receivers being provided with a sound-obstructing guard, substantially as described.

3. A sound-locating instrument consisting of two acoustic receivers whose mouths point in substantially opposite directions, each composed of non-sound-conducting walls, substantially as described.

In testimony whereof I have hereunto set my hand in the presence of two subscribing witnesses.

DAVID PORTER HEAP.

Witnesses:
H. T. MUNSON,
A. L. KENT.